US010595047B2

(12) United States Patent
Roh et al.

(10) Patent No.: US 10,595,047 B2
(45) Date of Patent: Mar. 17, 2020

(54) WIRELESS DISPLAY SUBSYSTEM AND SYSTEM-ON-CHIP

(71) Applicant: SAMSUNG ELECTRONICS CO., LTD., Suwon-si, Gyeonggi-do (KR)

(72) Inventors: Jong-Ho Roh, Yongin-si (KR); Gahng-Soo Moon, Yongin-si (KR); Won-Joon Jang, Seongnam-si (KR); Min-Je Jun, Seoul (KR); Kyung-Ah Jeong, Seoul (KR); Yong-Kwon Cho, Yongin-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 6 days.

(21) Appl. No.: 15/710,925

(22) Filed: Sep. 21, 2017

(65) Prior Publication Data

US 2018/0199068 A1  Jul. 12, 2018

(30) Foreign Application Priority Data

Jan. 12, 2017  (KR) ........................ 10-2017-0004611

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/66* | (2014.01) |
| *H04L 29/06* | (2006.01) |
| *H04N 19/423* | (2014.01) |
| *H04N 19/68* | (2014.01) |

(Continued)

(52) U.S. Cl.
CPC ........... *H04N 19/66* (2014.11); *H04L 65/607* (2013.01); *H04N 19/16* (2014.11); *H04N 19/172* (2014.11); *H04N 19/176* (2014.11); *H04N 19/423* (2014.11); *H04N 19/68* (2014.11); *H04N 21/4343* (2013.01); *H04N 21/4408* (2013.01)

(58) Field of Classification Search
CPC .... H04N 19/66; H04N 21/418; H04N 19/423; H04L 65/607
See application file for complete search history.

(56) References Cited

U.S. PATENT DOCUMENTS

| | | | |
|---|---|---|---|
| 7,565,677 B1 * | 7/2009 | Crinon ............. | H04N 21/23617 370/487 |
| 8,019,883 B1 * | 9/2011 | Margulis ................ | G06F 1/266 370/450 |

(Continued)

*Primary Examiner* — Fabio S Lima
(74) *Attorney, Agent, or Firm* — Lee & Morse, P.C.

(57) ABSTRACT

A wireless display subsystem includes a hardware composition generator, a hardware video encoder, and a wireless hardware transport stream multiplexer. The hardware composition generator reads video data from a memory device and generates video frame data by synthesizing the video data. The hardware video encoder receives the video frame data in an on-the-fly (OTF) manner from the hardware composition generator and generates a video stream by encoding the video frame data. The wireless hardware transport stream multiplexer receives the video stream in the OTF manner from the hardware video encoder, reads an audio stream from the memory device, multiplexes the video stream and the audio stream, and generates a wireless display packet by packetizing the multiplexed video and audio streams.

18 Claims, 15 Drawing Sheets

(51) Int. Cl.
     *H04N 21/434*      (2011.01)
     *H04N 19/16*       (2014.01)
     *H04N 19/172*     (2014.01)
     *H04N 21/4408*    (2011.01)
     *H04N 19/176*     (2014.01)

(56) References Cited

U.S. PATENT DOCUMENTS

| | | |
|---|---|---|
| 8,700,796 B2 | 4/2014 | Rajamani et al. |
| 8,917,608 B2 | 12/2014 | Jones, IV et al. |
| 2011/0107057 A1* | 5/2011 | Petolino, Jr. ........ G06F 12/1027 |
| | | 711/207 |
| 2011/0158604 A1* | 6/2011 | Sasaki .............. G11B 20/10527 |
| | | 386/239 |
| 2011/0276710 A1* | 11/2011 | Mighani ............ H04N 21/4325 |
| | | 709/231 |
| 2012/0054806 A1 | 3/2012 | Reznic et al. |
| 2012/0243602 A1 | 9/2012 | Rajamani et al. |
| 2013/0257687 A1 | 10/2013 | Chun et al. |
| 2014/0233732 A1* | 8/2014 | Buer ................. H04N 21/2347 |
| | | 380/200 |
| 2015/0036695 A1 | 2/2015 | Gowda et al. |
| 2015/0295982 A1 | 10/2015 | Kafle et al. |
| 2016/0286260 A1* | 9/2016 | Lawrence .......... H04N 21/4307 |
| 2018/0227539 A1* | 8/2018 | Schwartz ............ H04N 9/8233 |
| 2019/0089927 A1* | 3/2019 | Yadav ..................... H04N 5/92 |

\* cited by examiner

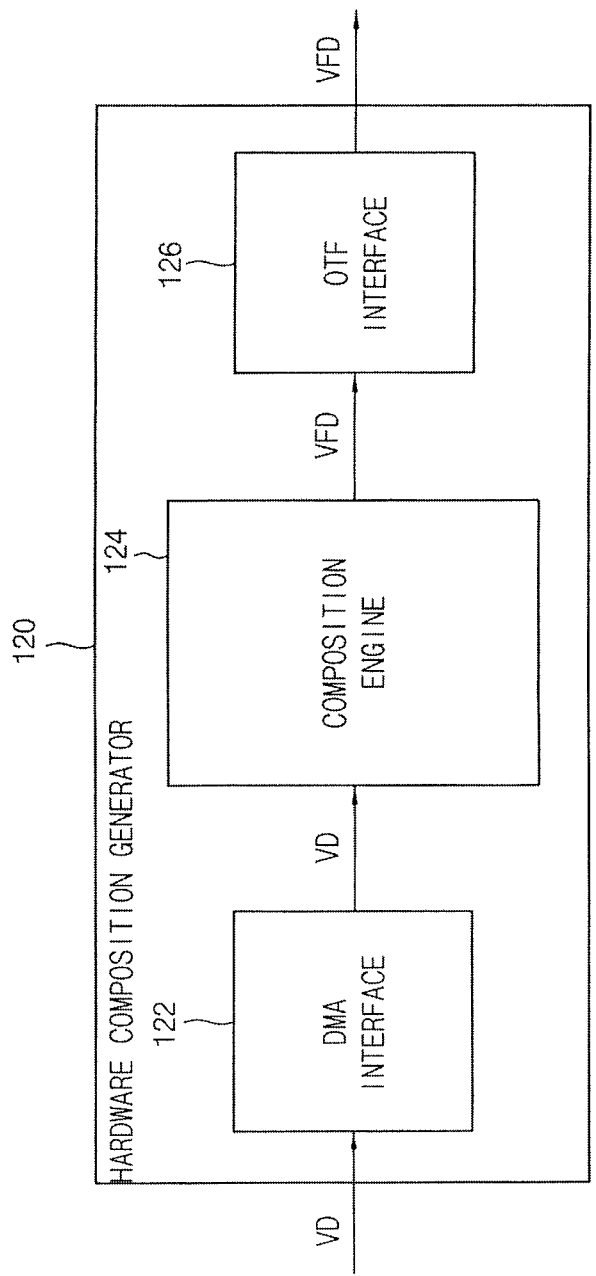

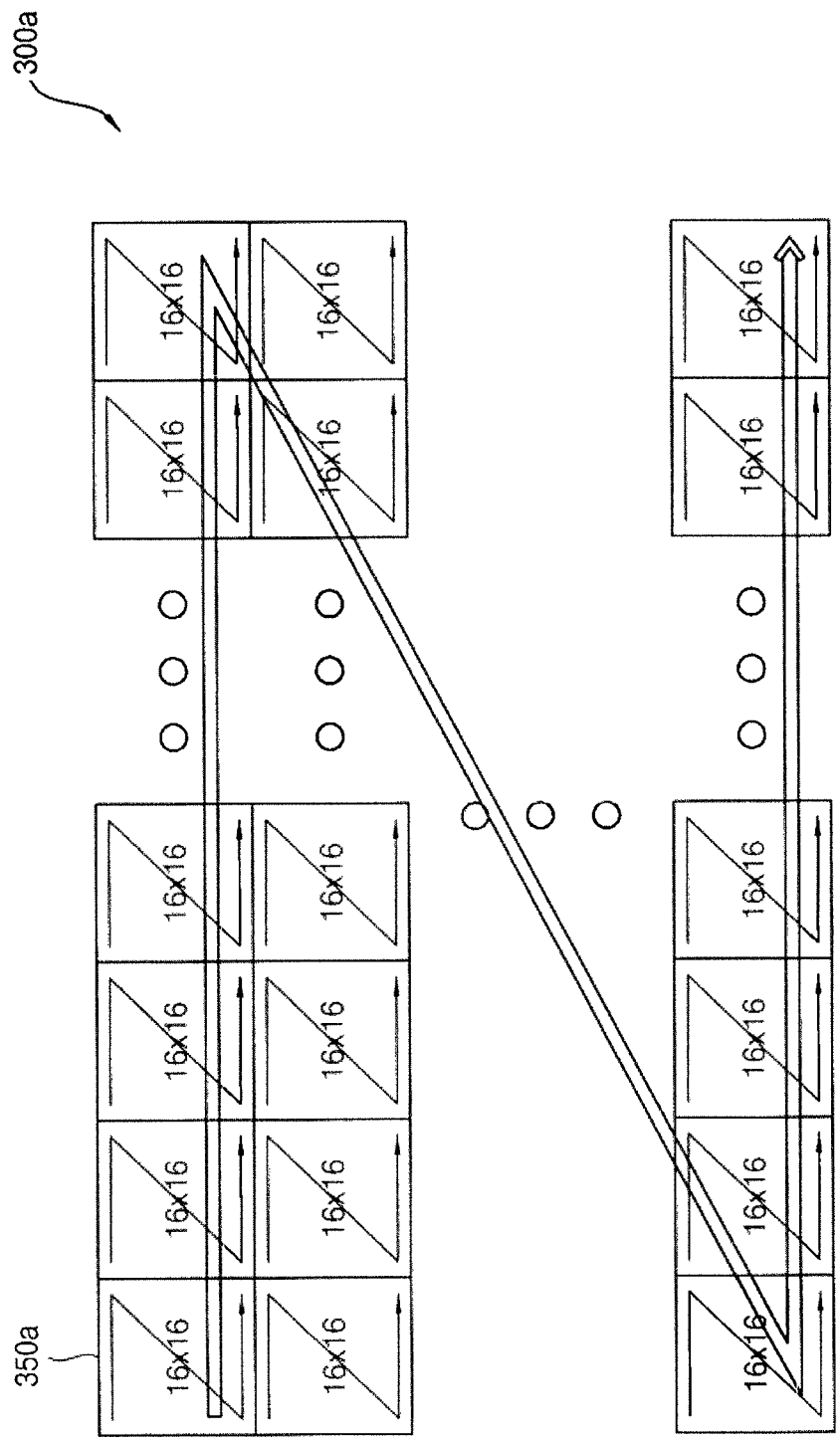

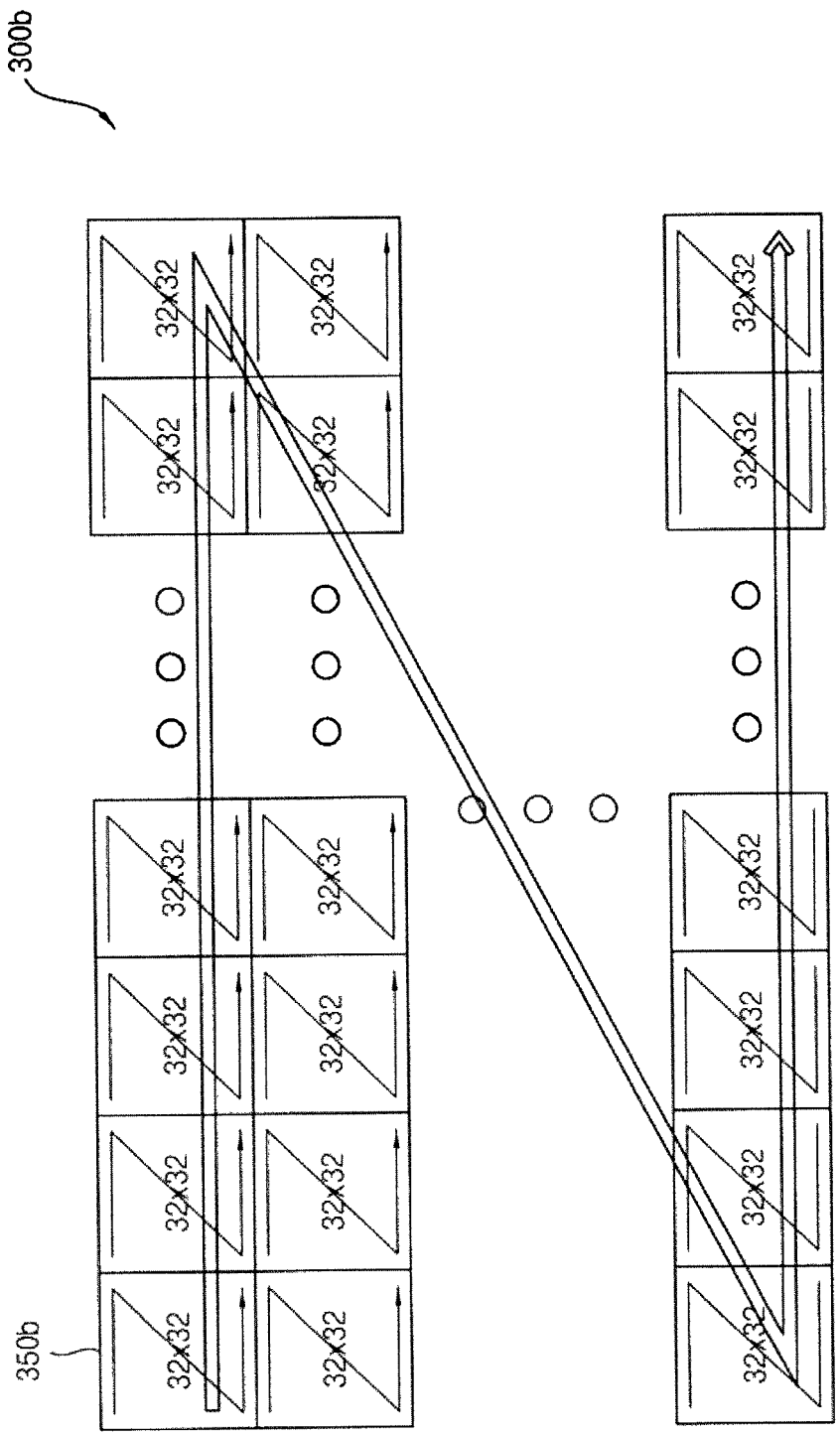

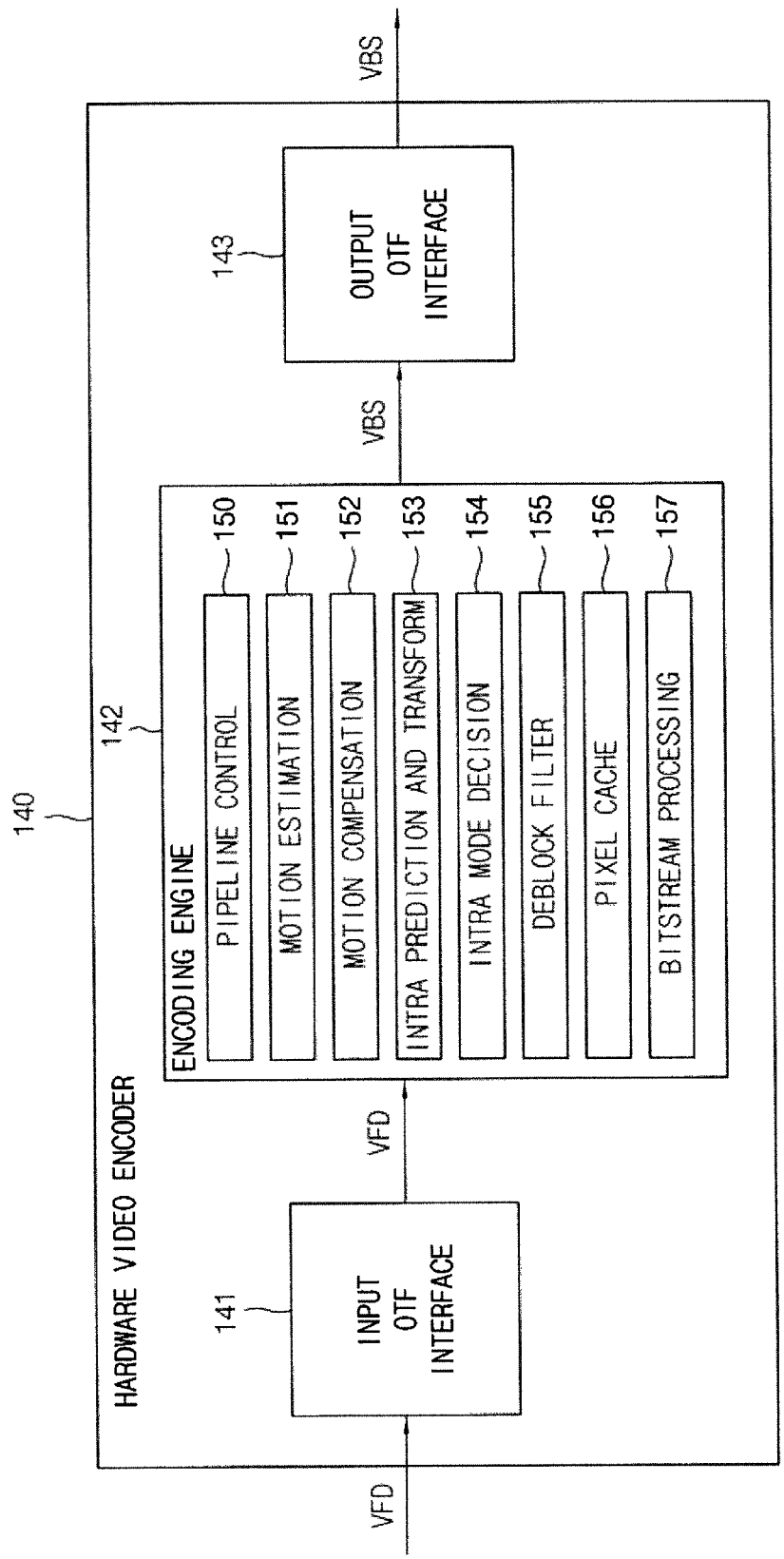

WIRELESS DISPLAY SUBSYSTEM AND SYSTEM-ON-CHIP

CROSS-REFERENCE TO RELATED APPLICATIONS

Korean Patent Application No. 10-2017-0004611, filed on Jan. 12, 2017, and entitled: "Wireless Display Subsystem and System-On-Chip," is incorporated by reference herein in its entirety.

BACKGROUND

1. Field

One or more embodiments described herein relate to a wireless display subsystem and a system-on-chip including a wireless display subsystem.

2. Description of the Related Art

Wireless display techniques have been developed to control the wireless transfer of video and/or audio data from an electronic device (e.g., mobile device) to an external display device. In order to perform these techniques, the video and/or audio data are processed to place them in a form suitable for wireless transfer. However, this data processing introduces a delay that increases the response time to inputs on the mobile device. The increase in response time produces a time lag (e.g., latency) in displaying information in response to the inputs.

SUMMARY

In accordance with one or more embodiments, a wireless display subsystem includes a hardware composition generator to read video data from a memory device and generate video frame data by synthesizing the video data; a hardware video encoder to receive the video frame data in an on-the-fly (OTF) manner from the hardware composition generator and generate a video stream by encoding the video frame data; and a wireless hardware transport stream multiplexer to receive the video stream in the OTF manner from the hardware video encoder, read an audio stream from the memory device, multiplex the video stream and the audio stream, and generate a wireless display packet by packetizing the multiplexed video and audio streams.

In accordance with one or more other embodiments, a system-on-chip (SOC) coupled to a memory device, the SOC including at least one processor and a wireless display subsystem, the wireless display subsystem including a hardware composition generator to read video data from the memory device and generate video frame data by synthesizing the video data; a hardware video encoder implemented to receive the video frame data in an on-the-fly (OTF) manner from the hardware composition generator and generate a video stream by encoding the video frame data; and a wireless hardware transport stream multiplexer to receive the video stream in the OTF manner from the hardware video encoder, read an audio stream from the memory device, multiplex the video stream and the audio stream, and generate a wireless display packet by packetizing the multiplexed video and audio streams.

In accordance with one or more other embodiments, a wireless display subsystem includes first hardware to generate video frame data; second hardware to receive the video frame data in an on-the-fly manner from the first hardware and encode the video frame data to form a video stream; and third hardware to receive the video stream in the on-the-fly manner from the second hardware, read an audio stream, multiplex the video stream and the audio stream, and packetizing the multiplexed video and audio streams to generate a wireless display packet.

BRIEF DESCRIPTION OF THE DRAWINGS

Features will become apparent to those of skill in the art by describing in detail exemplary embodiments with reference to the attached drawings in which:

FIG. 2 illustrates an embodiment of a hardware composition generator;

FIG. 5A and 5B illustrate embodiments of output orders of image data in video frame data output from the hardware composition generator;

FIG. 6 illustrates an embodiment of a hardware video encoder;

DETAILED DESCRIPTION

Figure 1:
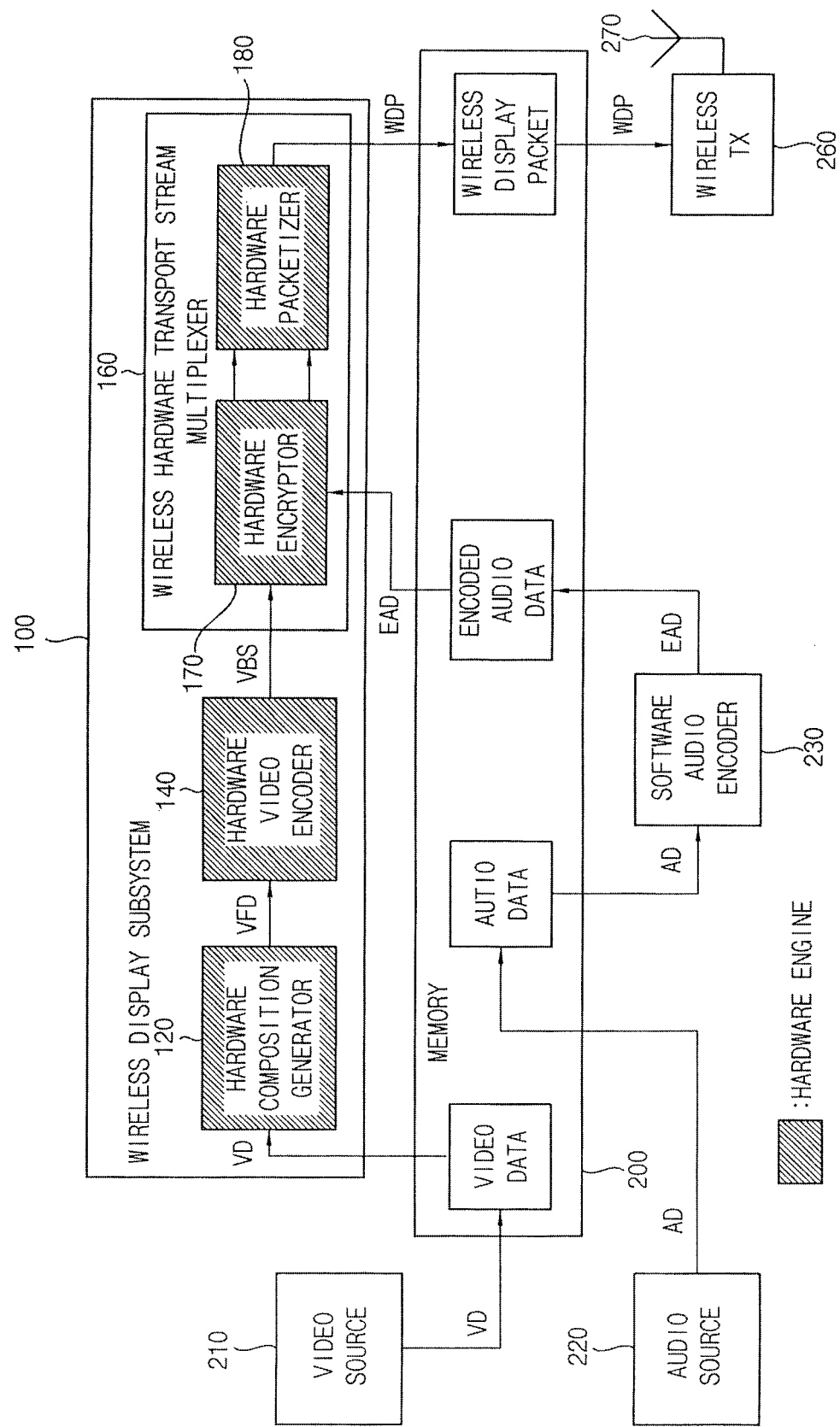
FIG. 1 illustrates an embodiment of a wireless display subsystem.

FIG. 1 illustrates an embodiment of a wireless display subsystem 100 which includes a hardware composition generator 120, a hardware video encoder 140, and a wireless hardware transport stream multiplexer 160, which, for example, may be implemented as hardware or hardware engines.

The hardware composition generator 120 may read video data VD from a memory device 200. The video data VD may be written to the memory device 200 by any video source 210. The video source 210 may be, for example, a graphics processing unit (GPU) that performs any graphics processing, a central processing unit (CPU), or an application processor (AP) that executes any application, an external storage device such as a flash memory, or a communication device that receives the video data VD through wired or wireless communications.

The hardware composition generator 120 may generate video frame data VFD by synthesizing the video data VD. The video data VD may be, for example, data corresponding to one or more image layers. The hardware composition generator 120 may generate video frame data VFD by synthesizing the image layers so that the image layers overlap. In some example embodiments, the video frame data VFD may include frame synchronization information per frame. For example, the frame synchronization information may include at least one of a frame start indication, a frame end indication, or a timestamp.

The hardware video encoder 140 may receive the video frame data VFD in an on-the-fly (OTF) manner from the hardware composition generator 120. Data transfer in the OTF manner between components or elements of the wireless display subsystem 100 may corresponding to the case where data output from one component are directly transferred to another component, without being stored in the memory device 200. By employing data transfers in the OTF manner, data generated by one component may be transferred to another component in substantially real time. That is, the video frame data VFD output from the hardware composition generator 120 may be directly transferred to the hardware video encoder 140 without being stored in the memory device 200.

The hardware video encoder 140 may generate a video stream VBS by encoding the video frame data VFD. In some example embodiments, the video stream VBS may include the frame synchronization information (e.g., the frame start indication, the frame end indication, and/or the timestamp) per frame. Since each of the video frame data VFD transferred between the hardware composition generator 120 and the hardware video encoder 140 and the video stream VBS transferred between the hardware video encoder 140 and the wireless hardware transport stream multiplexer 160 has the frame synchronization information including (e.g., at least one of the frame start indication, the frame end indication, or the timestamp), data may be processed in an accurate order in the wireless display subsystem 100. Also, synchronization between components 120, 140, 170 and 180 may be ensured.

The wireless hardware transport stream multiplexer 160 may receive the video stream VBS in the OTF manner from the hardware video encoder 140. For example, the video stream VBS output from the hardware video encoder 140 may be directly transferred to the wireless hardware transport stream multiplexer 160 without being stored in the memory device 200. The wireless hardware transport stream multiplexer 160 may read an audio stream from the memory device 200. In some example embodiments, the audio stream may be audio data AD written to the memory device 200 by any audio source 220. In other example embodiments, the audio stream may be encoded audio data EAD generated by encoding the audio data AD by an audio encoder (e.g., a software audio encoder) 230.

The wireless hardware transport stream multiplexer 160 may multiplex the video stream VBS and the audio stream EAD, and may generate a wireless display packet WDP by packetizing the multiplexed video and audio streams VBS and EAD. In some example embodiments, the wireless hardware transport stream multiplexer 160 may include a hardware packetizer 180 that performs multiplexing and packetizing on the video stream VBS and the audio stream EAD. In other example embodiments, the wireless hardware transport stream multiplexer 160 may further include a hardware encryptor 170 that performs encryption on the video stream VBS and the audio stream EAD. For example, the hardware encryptor 170 may perform high-bandwidth digital content protection (HDCP) encryption. In this case, the hardware packetizer 180 may perform multiplexing and packetizing on the encrypted video and audio streams VBS and EAD.

The wireless display packet WDP generated by the wireless hardware transport stream multiplexer 160 may be wirelessly transferred to an external wireless display device through a wireless transmitter 260 and an antenna 270. The wireless transmitter 260 may be, for example, a wireless-fidelity (Wi-Fi) transmitter, a wireless local area network (WLAN) transmitter, a bluetooth transmitter, a near field communication (NFC) transmitter, or another wireless communication transmitter. In some example embodiments, the wireless display packet WDP generated by the wireless hardware transport stream multiplexer 160 may be directly transferred to the wireless transmitter 260. In other example embodiments, as illustrated in FIG. 1, the wireless hardware transport stream multiplexer 160 may write the wireless display packet WDP to the memory device 200, and the wireless transmitter 260 may read the wireless display packet WDP from the memory device 200.

In one type of electronic device that has been proposed to wirelessly transfer video and/or audio data to an external display device, all or a portion of components that convert video data VD to a wireless display packet WDP suitable for wireless transfer are implemented as software. Accordingly, the proposed electronic device may have a large latency in wireless display data transfer. However, in the wireless display subsystem 100 according to example embodiments, the components that convert the video data VD to the wireless display packet WDP suitable for the wireless transfer (e.g., the hardware composition generator 120, the hardware video encoder 140, the hardware encryptor 170 and the hardware packetizer 180) may be implemented as hardware. Accordingly, an electronic device including the wireless display subsystem 100 may reduce the latency of the wireless display data transfer.

Further, in the proposed electronic device, data transfer between the components is performed using a memory device 200. For example, each component performs processing (e.g., composition, encoding, encryption, or the like) on data stored in the memory device 200 and stores results of the processing again in the memory device, which may be referred to as a memory-to-memory (M2M) operation. Subsequently, the next component also receives the results of the processing from the memory device 200.

However, in the wireless display subsystem 100 according to example embodiments, the data transfer between the components (e.g., the hardware composition generator 120, the hardware video encoder 140, the hardware encryptor 170 and the hardware packetizer 180) may be performed in the OTF manner without using the memory device 200. Thus, processing results of each component may not be stored in the memory device 200 and may be directly transferred to the next component in substantially real time. Accordingly, since the wireless display subsystem 100 forms an OTF path from the hardware composition generator 120 to the hardware packetizer 180, the electronic device including the wireless display subsystem 100 according to example embodiments may further reduce the latency of the wireless display data transfer.

FIG. 2 illustrates an embodiment of a hardware composition generator, which, for example, may correspond to the hardware composition generator 120 in the wireless display subsystem of FIG. 1. Referring to FIG. 2, the hardware composition generator 120 is implemented as hardware which includes a direct memory access (DMA) interface 122, a composition engine 124 and an OTF interface 126. The DMA interface 122 may perform an access operation to a memory device. The DMA interface 122 may receive video data VD from the memory device. The video data VD may be data corresponding to one or more image layers and/or one or more image objects.

The composition engine 124 may generate video frame data VFD based on the video data VD received through the DMA interface 122. For example, the composition engine 124 may generate the video frame data VFD corresponding to one frame by synthesizing the video data VD, so that the image layers and/or image objects overlap. In some example embodiments, the composition engine 124 may include a display data processor, a display and enhancement controller, or the like, but is not limited thereto. The OTF interface 126 may directly transfer the video frame data VFD generated by the composition engine 124 to a hardware video encoder.

Figure 3A:
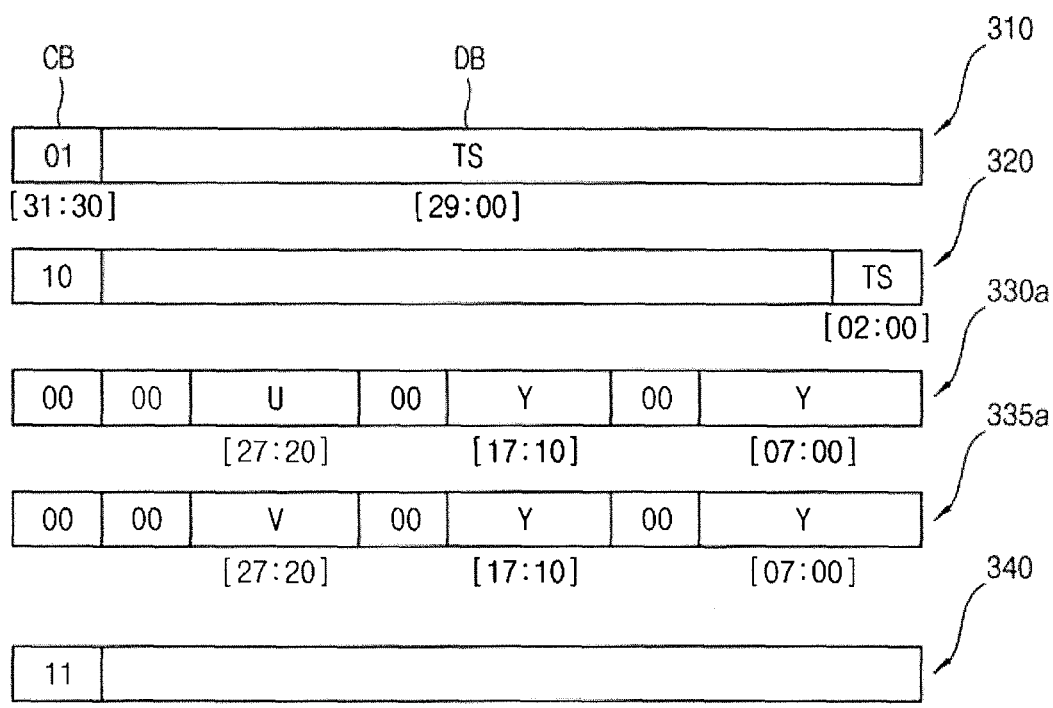
FIGS. 3A and 3B illustrate examples of data formats of video frame data output from the hardware composition generator.
Figure 3B:
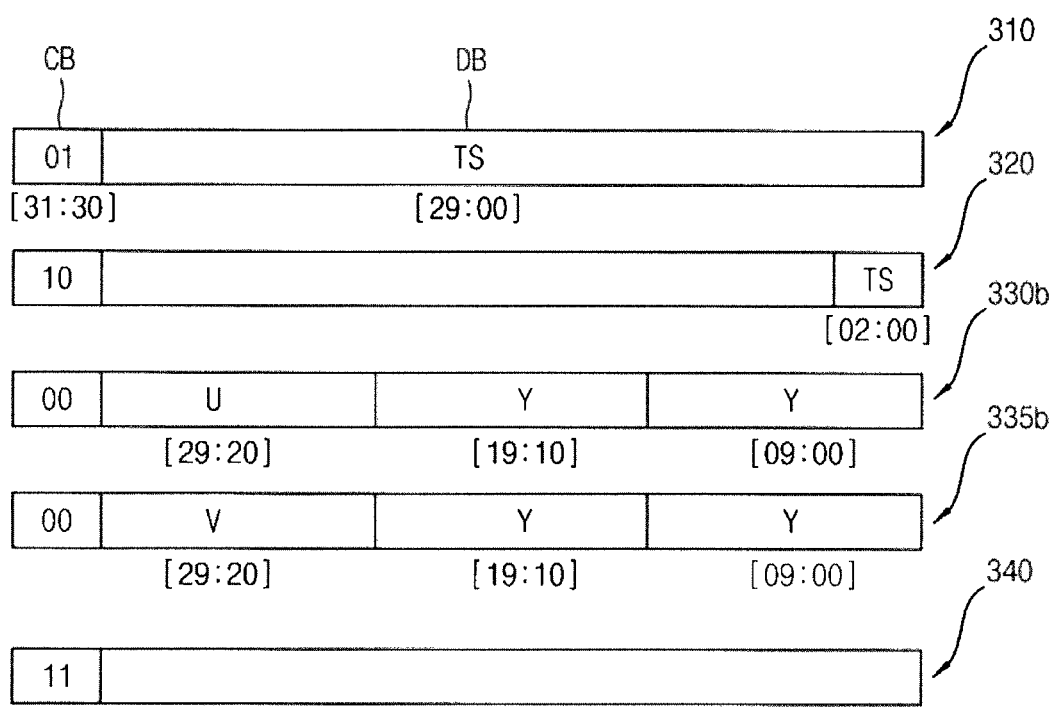

FIGS. 3A and 3B illustrate examples of data formats of video frame data output from a hardware composition generator, e.g., a hardware composition generator 120. Referring to FIG. 3A, video frame data output from the hardware composition generator may have a data format in a packet form including control bits CB and data bits DB.

For example, as illustrated in FIG. 3A, each packet 310, 320, 330a, 335a and 340 of the video frame data may include thirty data bits DB and two control bits CB. The control bits CB may indicate a frame start, a data transfer or a frame end. The packets 310, 320, 330a, 335a and 340 of the video frame data may be classified into frame start packets 310 and 320, data transfer packets 330a and 335a, and frame end packets 340 according to the control bits CB.

The frame start packets 310 and 320 may include, as the data bits DB, a timestamp TS representing time information of each frame. For example, a first frame start packet 310 may have the control bits CB of '01' and may include, as the data bits DB, thirty bits of the 33-bit timestamp TS. A second frame start packet 320 may have the control bits CB of '10' and may include, as the data bits DB, the remaining three bits of the 33-bit timestamp TS.

Each data transfer packet 330a and 335a may have the control bits CB of '00', and may include, as the data bits DB, image data (e.g., YUV data). In an example, a first data transfer packet 330a may include, as the data bits DB, two 8-bit Y data (or luminance data) and one 8-bit U data (or chrominance data), and a second data transfer packet 335a may include, as the data bits DB, two 8-bit Y data and one 8-bit V data (or chrominance data). The first data transfer packet 330a and the second data transfer packet 335a may be alternately transferred. Although FIG. 3A illustrates an example of the data format of the video frame data including 4:1:1 YUV data as the image data, the image data of the video frame data are not limited thereto. The frame end packet 340 may have the control bits CB of '11'.

The data format in FIG. 3B may be substantially the same as the data format in FIG. 3A, except that each data transfer packet 330b and 330b includes 10-bit Y, U or V data. A first data transfer packet 330b may include, as the data bits DB, two 10-bit Y data and one 10-bit U data, and a second data transfer packet 335b may include, as the data bits DB, two 10-bit Y data and one 10-bit V data. The first data transfer packet 330b and the second data transfer packet 335b may be alternately transferred.

Figure 4:
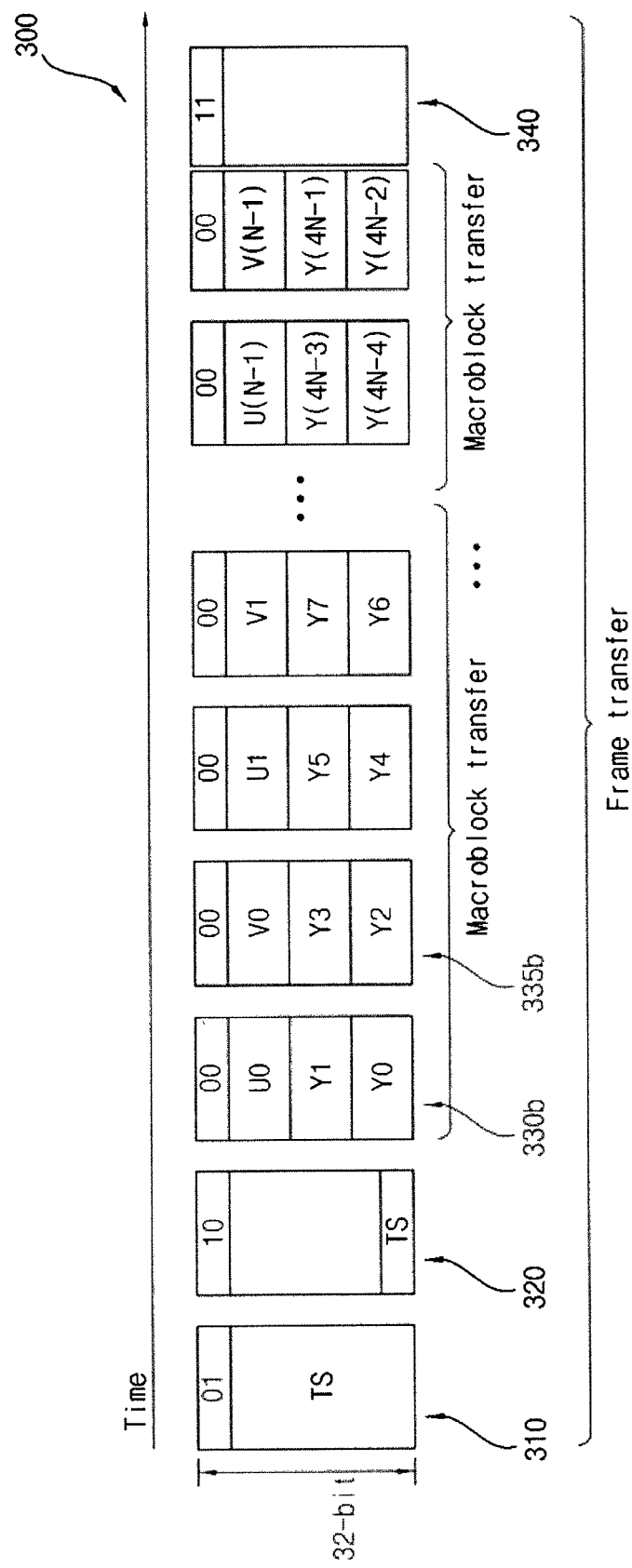
FIG. 4 illustrates another example of a data format of video frame data output from the hardware composition generator.

FIG. 4 illustrates an example of a data format of video frame data output from a hardware composition generator, e.g., a hardware composition generator 120. FIG. 5A illustrates an example of an output order of image data included in video frame data output from a hardware composition generator. FIG. 5B illustrates another example of an output order of image data included in video frame data output from a hardware composition generator, e.g., a hardware composition generator 120.

FIG. 4 illustrates an example for transferring video frame data 300 having the data format in FIG. 3B for one frame. First and second frame start packets 310 and 320 including a timestamp TS may be first transferred. Subsequently, a first data transfer packet 330b including two 10-bit Y data and one 10-bit U data and a second data transfer packet 335b including two 10-bit Y data and one 10-bit V data may be alternately transferred. Thus, the video frame data 300 corresponding to one frame may include 4N Y data Y0 through Y(4N-1), N U data U0 through U(N-1) and N V data V0 through V(N-1). A hardware composition generator may divide each frame into macro blocks on each of which a hardware video encoder performs encoding, and may transfer the video frame data 300 to the hardware video encoder on a macro block unit basis.

For example, in FIG. 5A, the hardware composition generator may divide one frame 300a into a plurality of macro blocks 350a, each including 16*16 pixels. The hardware composition generator may sequentially transfer image data for the macro blocks 350a to the hardware video encoder. For example, the hardware composition generator may first transfer the data transfer packets 330b and 335b including the image data for one macro block 350a, and then may transfer the data transfer packets 330b and 335b including the image data for the next macro block 350a. As an example, in FIG. 5A, the hardware composition generator may transfer the image data for the pixels in a raster scan order with respect to each macro block 350a, and may transfer the image data for the macro blocks 350a also in the raster scan order with respect to one frame 300a.

As another example, in FIG. 5B, the hardware composition generator may divide one frame 300b into a plurality of macro blocks 350b each including 32*32 pixels, and may sequentially transfer the image data for the macro blocks 350b to the hardware video encoder. The sizes of macro blocks 350a and 350b may be different in another embodiment.

Once transfer of the image data for the entire frame 300a and 300b is completed, the hardware composition generator may transfer a frame end packet 340 to the hardware video encoder.

FIG. 6 illustrates an embodiment of the hardware video encoder 140 in the wireless display subsystem of FIG. 1. Referring to FIG. 6, the hardware video encoder 140 is implemented as hardware which includes an input OTF interface 141, an encoding engine 142 and an output OTF interface 143. The input OTF interface 141 may directly receive video frame data VFD from a hardware composition generator.

The encoding engine 142 may generate a video stream VBS by encoding the video frame data VFD received through the input OTF interface 141. For example, the encoding engine 142 may perform intra-mode (e.g., I-mode) encoding for reducing a spatial redundancy within one frame, one macro block or one slice, and/or inter-mode (e.g., unidirectional predictive P-mode or bidirectional predictive B-mode) encoding for reducing a temporal redundancy between adjacent frames, macro blocks or slices.

In some example embodiments, as illustrated in FIG. 6, the encoding engine 142 may include a pipeline control unit 150, a motion estimation unit 151, a motion compensation unit 152, an intra prediction and transform unit 153, an intra mode decision unit 154, a deblock filter 155, a pixel cache 156 and a bitstream processing unit 157. The encoding engine 142 may have a different configuration in another embodiment. The output OTF interface 143 may directly transfer the video stream VBS generated by the encoding engine 142 to a wireless hardware transport stream multiplexer.

Figure 7:
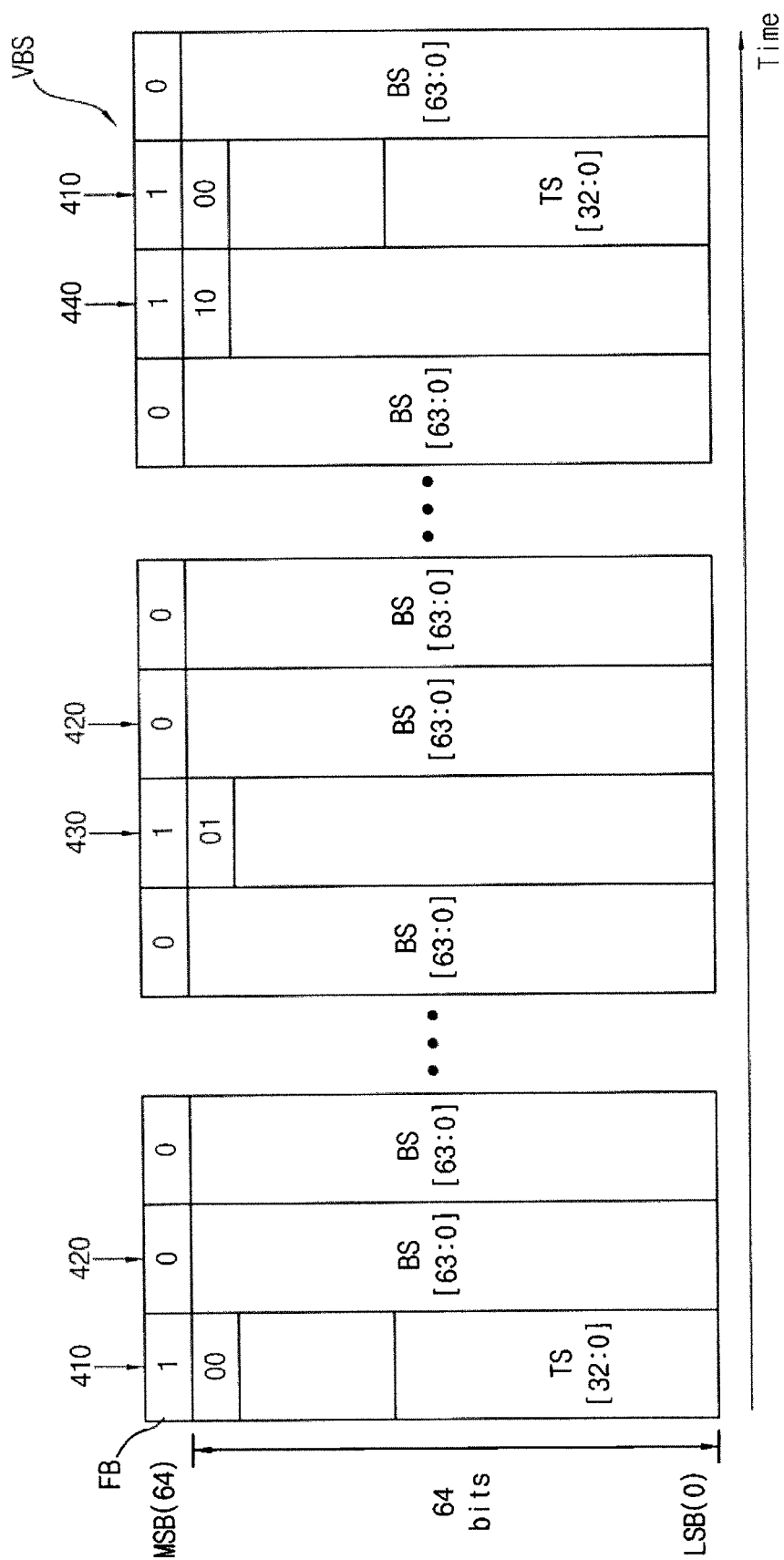
FIG. 7 illustrates an example of a video stream output from the hardware video encoder.

FIG. 7 illustrates an example of a video stream VBS output from a hardware video encoder. Referring to FIG. 7, the video stream VBS may have a data format in a form of packets 410, 420, 430 and 440, each including one flag bit FB and sixty four data bits. The flag bit FB may indicate information corresponding to at least one of the data bits, a frame start, a slice start, a data transfer, a slice end, or a frame end. For example, the flag bit FB of '0' may indicate a data transfer or may indicate a slice start along with the data transfer. The flag bit FB of '1' may indicate a frame start, slice end, or frame end.

In the example of FIG. 7, a packet 410 including the flag bit FB of '1' and the data bits [63:62] of '00' may be a frame start packet and may include, as data bits, a timestamp TS representing time information of each frame.

A packet 420 including the flag bit FB of '0' may be a data transfer packet and may include, as the data bits, a bitstream BS of encoded image data for each slice.

A packet 430 including the flag bit FB of '1' and data bits [63:62] of '01' may be a slice end packet. The data transfer packet 420 next to the frame start packet 410 or the slice end packet 430 may indicate the slice start along with the data transfer. Once the bitstream BS of the encoded image data for all slices in one frame is transferred, a frame end packet 440 including the flag bit FB of '1' and the data bits [63:62] of '10' may be transferred.

Figure 8:
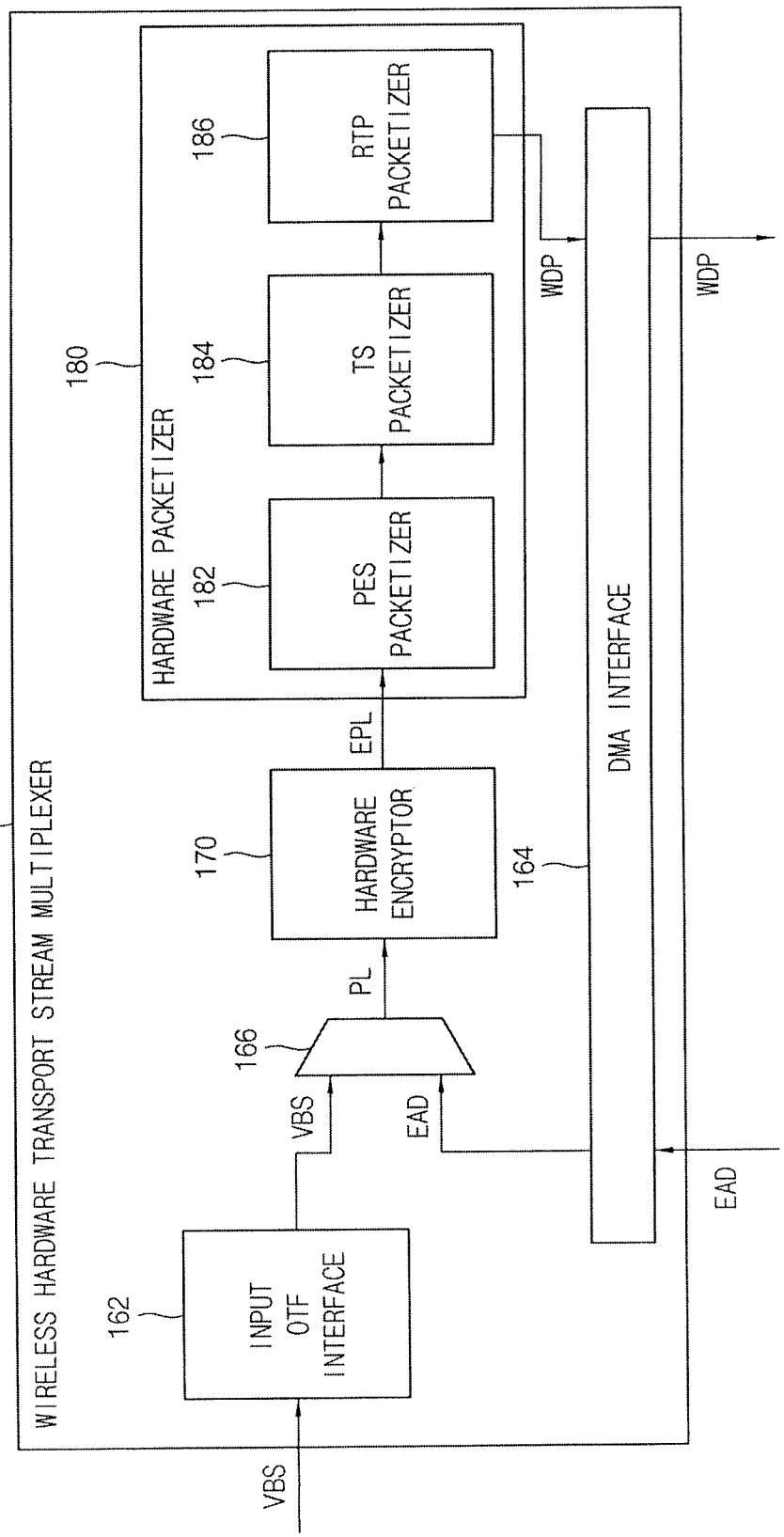
FIG. 8 illustrates an embodiment of a wireless hardware transport stream multiplexer.

FIG. 8 illustrates an embodiment of the wireless hardware transport stream multiplexer 160 in the wireless display subsystem of FIG. 1. Referring to FIG. 8, the wireless hardware transport stream multiplexer 160 may be implemented as hardware which includes an input OTF interface 162, a DMA interface 164, a multiplexer 166, a hardware encryptor 170 and a hardware packetizer 180. The input OTF interface 162 may directly receive a video stream VBS from a hardware video encoder. The DMA interface 164 may receive an audio stream EAD from a memory device. The multiplexer 166 may selectively output, as a payload PL to be packetized to a wireless display packet WDP, the video stream VBS received through the input OTF interface 162 or the audio stream EAD received through the DMA interface 164. The hardware encryptor 170 may perform encryption (e.g., HDCP encryption) on the payload PL from the multiplexer 166 and may output an encrypted payload EPL.

The hardware packetizer 180 may packetize the encrypted payload EPL output from the hardware encryptor 170 to the wireless display packet WDP. In some example embodiments, the hardware packetizer 180 may include a packetized elementary stream (PES) packetizer 182, a transport stream (TS) packetizer 184, and a real-time transport protocol (RTP) packetizer 186. The packetized elementary stream (PES) packetizer 182 packetizes the encrypted payload EPL to a PES packet by adding a PES header to the encrypted payload EPL. The transport stream (TS) packetizer 184 packetizes at least one PES packet to a TS packet by adding a TS header to the at least one PES packet. The real-time transport protocol (RTP) packetizer 186 packetizes at least one TS packet to a RTP packet (or the wireless display packet WDP) by adding a RTP header to the at least one TS packet.

For example, the PES header may include, but is not limited to, a packet start code prefix, a stream ID, a PES packet length, etc. The TS header may include, but is not limited to, a sync byte, a transport error indicator, a payload unit start indicator, a transport priority, a packet ID, a transport scrambling control, an adaptation field control, a continuity counter, etc. The RTP header may include, but is not limited to, a version, a padding, an extension, a contributing source (CSRC) count, a marker, a payload type, a sequence number, a timestamp, a synchronization source (SSRC), etc. The wireless display packet WDP generated by the hardware packetizer 180 may be written to the memory device through the DMA interface 164.

Figure 9:
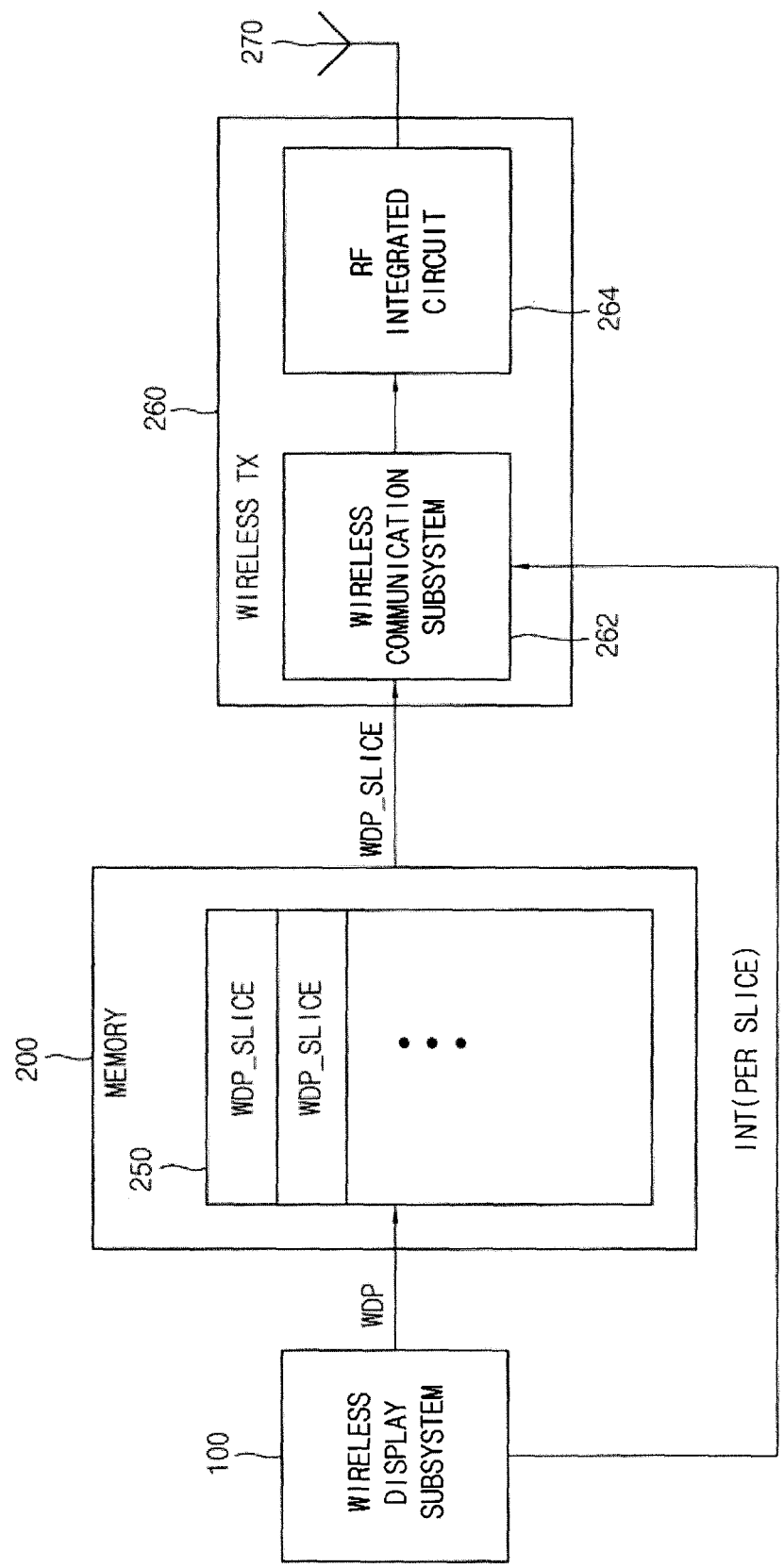
FIG. 9 illustrates an example where a wireless display subsystem requests a wireless transmitter to transfer a wireless display packet.

FIG. 9 illustrates an example where the wireless display subsystem 100 requests a wireless transmitter to transfer a wireless display packet. Referring to FIG. 9, a wireless display packet WDP generated by a wireless display subsystem 100 (or a wireless hardware transport stream multiplexer in the wireless display subsystem 100) may be written to a region 250 of a memory device 200. The wireless display subsystem 100 (or the wireless hardware transport stream multiplexer) may request a wireless transmitter 260 to wirelessly transfer the wireless display packet WDP before the entire wireless display packet(s) WDP corresponding to one frame is written to the memory region 250.

In some example embodiments, the wireless display subsystem 100 (or the wireless hardware transport stream multiplexer) may divide one frame into a plurality of slices and may request the wireless transmitter 260 to wirelessly transfer the wireless display packet WDP_SLICE each time the wireless display packet WDP_SLICE corresponding to one slice is written to memory region 250 or the memory device 200. For example, the wireless display subsystem 100 (or the wireless hardware transport stream multiplexer) may generate an interrupt signal INT each time the wireless display packet WDP_SLICE corresponding to one slice is written to the memory device 200. A wireless communication subsystem 262 may control a radio frequency (RF) integrated circuit 264 to wirelessly transfer the wireless display packet WDP_SLICE in response to the interrupt signal INT. The RF integrated circuit 264 may transfer the wireless display packet WDP_SLICE to an external wireless display device through an antenna 270.

Figure 10:
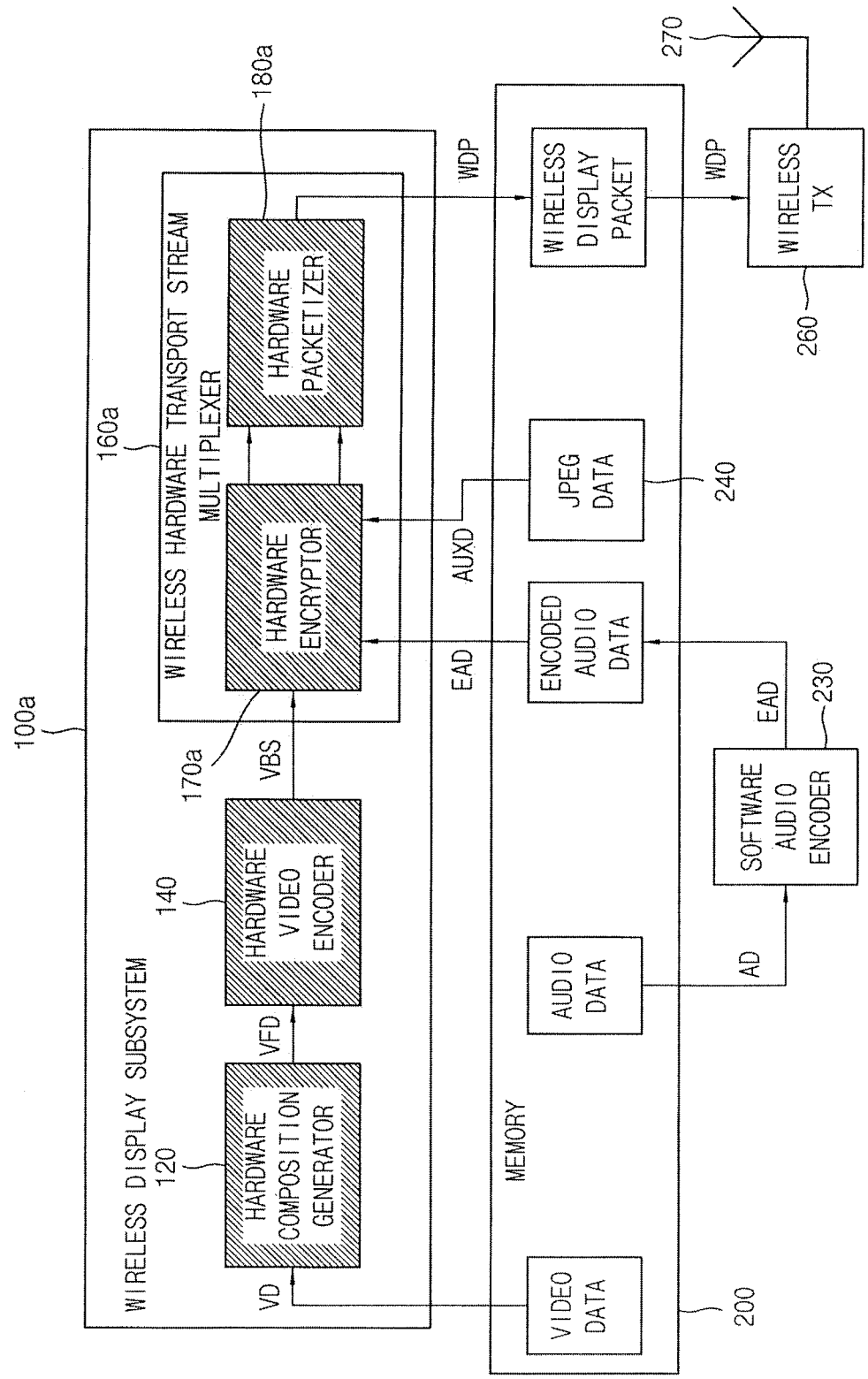
FIG. 10 illustrates another embodiment of a wireless display subsystem.

FIG. 10 illustrates another embodiment of a wireless display subsystem 100a which has a similar configuration to wireless display subsystem 100 of FIG. 1, except that a wireless hardware transport stream multiplexer 160a further reads an auxiliary stream AUXD from a memory device 200. The wireless hardware transport stream multiplexer 160a may receive not only a video stream VBS and an audio stream EAD, but also the auxiliary stream AUXD. In some example embodiments, the auxiliary stream AUXD may include still image data, e.g., joint photographic experts group (JPEG) data, portable network graphics (PNG) data, etc. In other example embodiments, the auxiliary stream AUXD may include moving image data, e.g., H.264 data. The auxiliary stream AUXD may include data different from or in addition to still and moving image data in other embodiments.

The wireless hardware transport stream multiplexer 160a may multiplex the video stream VBS, the audio stream EAD, and the auxiliary stream AUXD, and may generate a wireless display packet WDP by packetizing the multiplexed video, audio, and auxiliary streams VBS, EAD and AUXD. For example, a hardware encryptor 170a may perform encryption on the video stream VBS, the audio stream EAD, and the auxiliary stream AUXD, and a hardware packetizer 180 may perform multiplexing and packetizing on the encrypted video, audio and auxiliary streams VBS, EAD and AUXD.

Figure 11A:
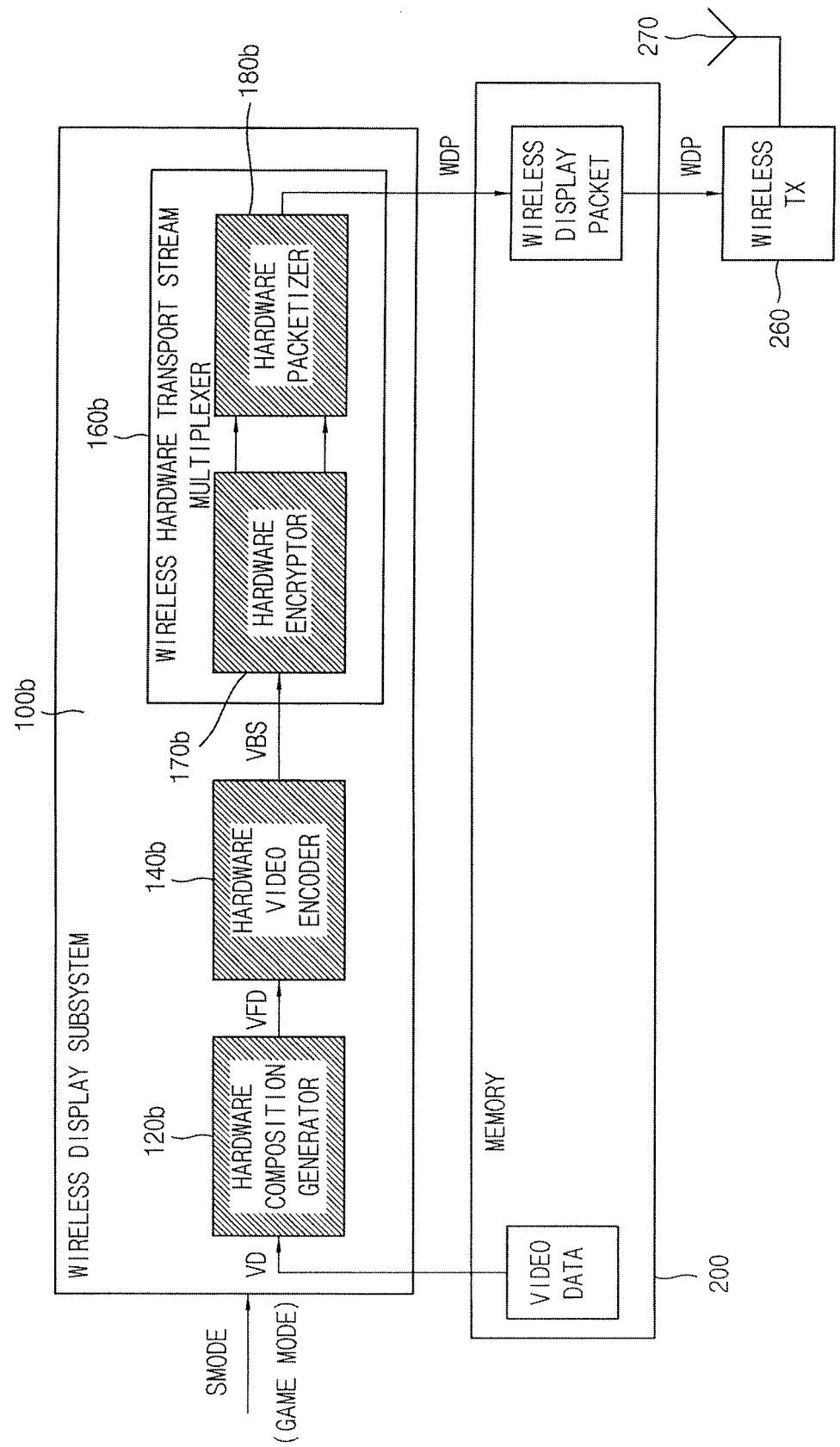
FIG. 11A illustrates operation of a wireless display subsystem in game mode according to an embodiment.
Figure 11B:
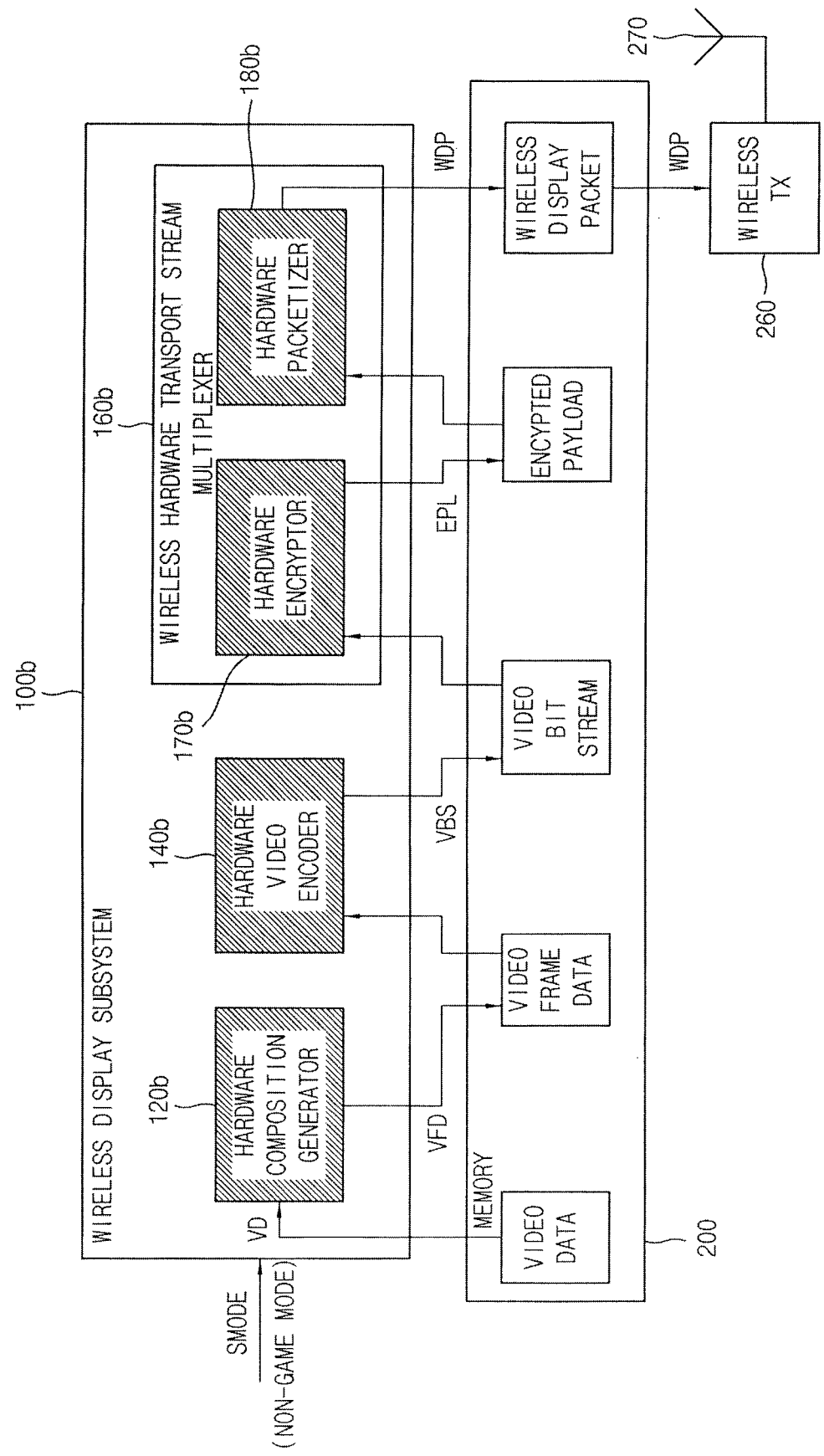
FIG. 11B illustrates operation of a wireless display subsystem in a non-game mode according to an embodiment.

FIG. 11A illustrates an example of an operation of a wireless display subsystem 100b in a game mode, and FIG. 11B illustrates an example of an operation of the wireless display subsystem 100b in a non-game mode. The wireless display subsystem 100b of FIGS. 11A and 11B may have a similar configuration to that of a wireless display subsystem 100 of FIG. 1, except that the wireless display subsystem 100b receives a mode signal SMODE.

The wireless display subsystem 100b may receive a mode signal SMODE indicating a game mode or a non-game mode. As illustrated in FIG. 11A, when the mode signal SMODE indicates the game mode, a hardware composition generator 120b, a hardware video encoder 140b, and a wireless hardware transport stream multiplexer 160b (e.g., hardware encryptor 170b and hardware packetizer 180b) may perform a data transfer in an OTF manner without using a memory device 200, as described above with reference to FIG. 1.

As illustrated in FIG. 11B, when the mode signal SMODE indicates the non-game mode, the hardware composition generator 120b, the hardware video encoder 140b, and the wireless hardware transport stream multiplexer 160b (e.g., hardware encryptor 170b and hardware packetizer 180b) may perform the data transfer in a M2M manner (which is a data transfer manner in one type of proposed wireless display subsystem) using memory device 200.

The hardware composition generator 120b may read video data VD from the memory device 200 to receive an input and may write video frame data VFD to the memory device 200 to provide an output.

The hardware video encoder 140b may read the video frame data VFD from the memory device 200 to receive an input and may write a video stream VBS to the memory device 200 to provide an output.

The hardware encryptor 170b may read the video stream VBS (along with audio and/or auxiliary streams) from the memory device 200 to receive an input and write an encrypted payload EPL to the memory device 200 to provide an output.

The hardware packetizer 180b may read the encrypted payload EPL from the memory device 200 to receive an input and may write a wireless display packet WDP to the memory device 200 to provide an output.

Thus, the wireless display subsystem 100b may operate like the proposed wireless display subsystem in the non-game mode and may generate the wireless display packet WDP in the OTF manner in the game mode, in order to rapidly transfer the wireless display packet WDP to an external wireless display device. Accordingly, when an electronic device including the wireless display subsystem 100b operates in the game mode, a visual (and/or aural) response to an input of a user to the electronic device may be rapidly displayed at the external wireless display device.

In some example embodiments, when the mode signal SMODE indicates the game mode, the hardware video encoder 140b may only perform encoding on the video frame data VFD. However, when the mode signal SMODE indicates the non-game mode, the hardware video encoder 140b may perform not only encoding on the video frame data VFD but also decoding on other video data (e.g., data for video played at the electronic device including wireless display subsystem 100b) in a time divisional manner. Accordingly, the hardware video encoder 140b may serve as an encoder for the wireless display data transfer and may also serve as a decoder for the video playback at the same time.

Figure 12:
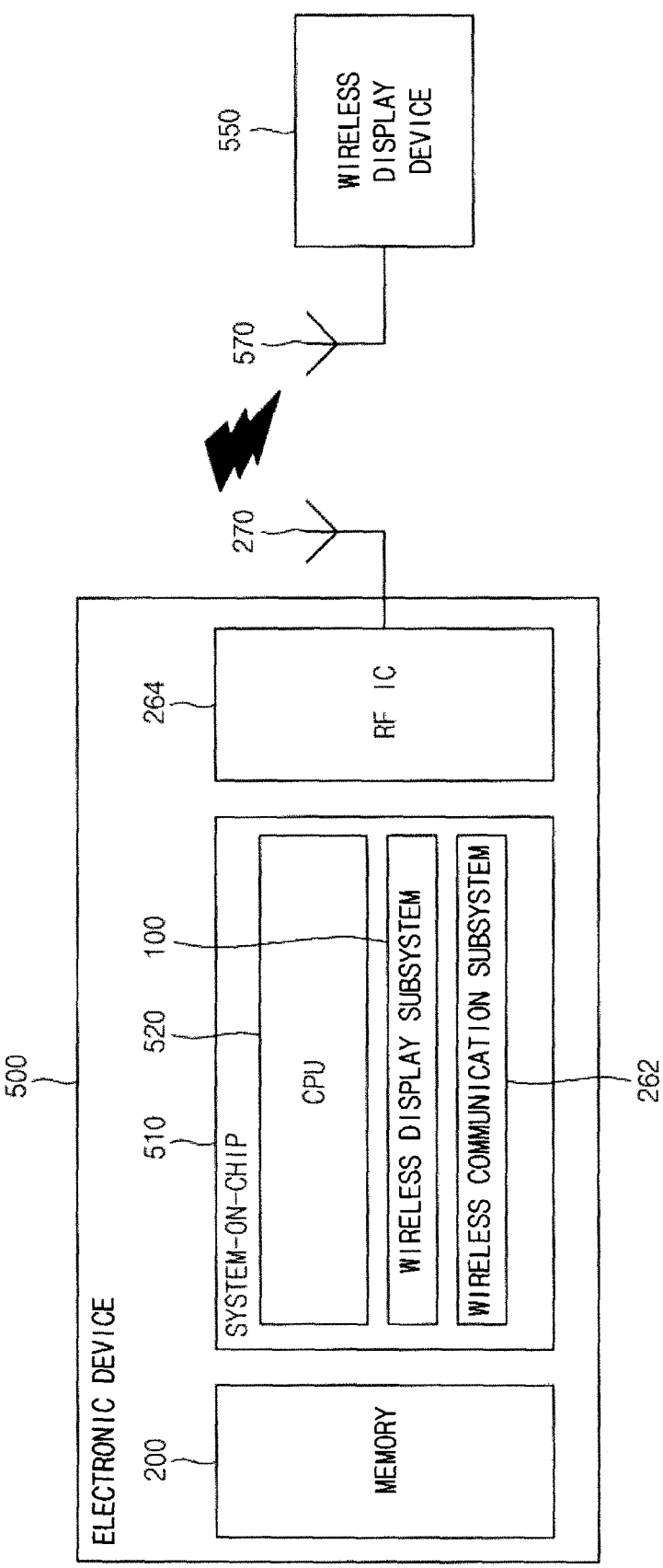
FIG. 12 illustrates an embodiment of an electronic device including a system-on-chip.

FIG. 12 illustrates an embodiment of an electronic device 500 including a system-on-chip (SOC) 510. Referring to FIG. 12, the electronic device 500 may include a memory device 200, the SOC 510 coupled to the memory device 200, an RF integrated circuit 264, and a transmitting antenna 270. In some example embodiments, the electronic device 500 may be any mobile device including, but not limited to, a smart phone, a mobile phone, a tablet computer, a laptop computer, a digital camera, a portable game console, an MP3 player, a personal digital assistants (PDA), a portable multimedia player (PMP), etc.

The SOC 510 may include a processor 520 (e.g., a CPU, an AP, etc.) and a wireless display subsystem 100. The wireless display subsystem 100 may include a hardware composition generator, a hardware video encoder and a wireless hardware transport stream multiplexer implemented as hardware, and may perform a data transfer in an OTF manner between the hardware composition generator, the hardware video encoder, and the wireless hardware transport stream multiplexer. Accordingly, the wireless display subsystem 100 may reduce latency of a wireless display data transfer.

The SOC 510 may further include a wireless communication subsystem 262 that controls the RF integrated circuit 264 to wirelessly transfer a wireless display packet generated by the wireless display subsystem 100 to a wireless display device 550. The wireless communication subsystem 262 may include, for example, a Wi-Fi subsystem, a WLAN subsystem, and/or a Bluetooth subsystem. The RF integrated circuit 264 controlled by the wireless communication subsystem 262 may wirelessly transfer the wireless display packet through the transmitting antenna 270. The wireless display device 550 may receive the wireless display packet through a receiving antenna 570, and may output a video and/or an audio based on the wireless display packet.

The embodiments described herein may be applied, for example, to any SOC and any electronic device including the SOC. Examples of the electronic device include but are not limited to a smart phone, a mobile phone, a tablet computer, a laptop computer, a personal computer, an MP3 player, a PDA, a PMP, a digital TV, a digital camera, portable game console, etc.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A wireless display subsystem, comprising:
   a hardware composition generator to read video data from a memory device and generate video frame data by synthesizing the video data;
   a hardware video encoder to receive the video frame data from the hardware composition generator and generate an encoded video stream by encoding the video frame data; and
   a wireless hardware transport stream multiplexer to receive the encoded video stream in an on-the-fly (OTF) manner from the hardware video encoder in a first mode, to receive the encoded video stream in a memory-to-memory (M2M) manner from the memory device in a second mode, to read an encoded audio stream from the memory device, to multiplex the encoded video stream and the encoded audio stream to generate multiplexed video and audio streams, and to generate a wireless display packet by packetizing the multiplexed video and audio streams;

wherein the video frame data output from the hardware composition generator are to be directly transferred to the hardware video encoder without being stored in the memory device in the first mode and are to be indirectly transferred to the hardware video encoder through the memory device in the second mode, and the encoded video stream output from the hardware video encoder are to be directly transferred to the wireless hardware transport stream multiplexer without being stored in the memory device in the first mode and are to be indirectly transferred to the wireless hardware transport stream multiplexer through the memory device in the second mode.

2. The wireless display subsystem as claimed in claim 1, wherein each of the video frame data transferred between the hardware composition generator and the hardware video encoder and the encoded video stream transferred between the hardware video encoder and the wireless hardware transport stream multiplexer includes frame synchronization information per frame.

3. The wireless display subsystem as claimed in claim 1, wherein the wireless hardware transport stream multiplexer includes a hardware packetizer to perform multiplexing and packetizing on the encoded video stream and the encoded audio stream.

4. The wireless display subsystem as claimed in claim 3, wherein the wireless hardware transport stream multiplexer includes:
a hardware encryptor to perform encryption on the encoded video stream and the encoded audio stream to generate encrypted video and audio streams, wherein the hardware packetizer is to perform multiplexing and packetizing on the encrypted video and audio streams.

5. The wireless display subsystem as claimed in claim 1, wherein the hardware composition generator is to divide each frame into macro blocks on each of which the hardware video encoder performs encoding and to transfer the video frame data to the hardware video encoder on a macro block unit basis.

6. The wireless display subsystem as claimed in claim 1, wherein the hardware composition generator includes:
a direct memory access (DMA) interface to receive the video data from the memory device;
a composition engine to generate the video frame data based on the video data received through the DMA interface; and
an OTF interface to directly transfer the video frame data generated by the composition engine to the hardware video encoder.

7. The wireless display subsystem as claimed in claim 1, wherein the hardware video encoder includes:
an input OTF interface to directly receive the video frame data from the hardware composition generator;
an encoding engine to generate the encoded video stream by encoding the video frame data received through the input OTF interface; and
an output OTF interface to directly transfer the encoded video stream generated by the encoding engine to the wireless hardware transport stream multiplexer.

8. The wireless display subsystem as claimed in claim 1, wherein the wireless hardware transport stream multiplexer is to:
write the wireless display packet to the memory device, divide each frame into a plurality of slices, and request a wireless transmitter to transfer the wireless display packet each time the wireless display packet corresponding to one slice is written to the memory device.

9. The wireless display subsystem as claimed in claim 1, wherein the wireless hardware transport stream multiplexer includes:
an input OTE interface to directly receive the encoded video stream from the hardware video encoder;
a DMA interface to receive the encoded audio stream from the memory device;
a multiplexer to selectively output, as a payload to be packetized as the wireless display packet, the encoded video stream received through the input GTE interface or the encoded audio stream received through the DMA interface;
a hardware encryptor to encrypt the payload output from the multiplexer; and
a hardware packetizer to packetize the encrypted payload to the wireless display packet.

10. The wireless display subsystem as claimed in claim 1, wherein the wireless hardware transport stream multiplexer is to:
read an auxiliary stream from the memory device,
multiplex the encoded video stream, the encoded audio stream and the auxiliary stream to generate multiplexed video, audio, and auxiliary streams, and
generate the wireless display packet by packetizing the multiplexed video, audio, and auxiliary streams.

11. The wireless display subsystem as claimed in claim 1, wherein:
the wireless display subsystem is to receive a mode signal indicating the first mode as a game mode or the second mode as a non-game mode,
the hardware composition generator, the hardware video encoder, and the wireless hardware transport stream multiplexer are to perform a data transfer in the memory-to-memory (M2M) manner using the memory device when the mode signal indicates the non-game mode, and
the hardware composition generator, the hardware video encoder, and the wireless hardware transport stream multiplexer are to perform a data transfer in the OTF manner without using the memory device when the mode signal indicates the game mode.

12. The wireless display subsystem as claimed in claim 11, wherein:
when the mode signal indicates the non-game mode, the hardware video encoder is to perform encoding on the video frame data and decoding on other video data in a time divisional manner, and
when the mode signal indicates the game mode, the hardware video encoder is to perform only encoding on the video frame data.

13. A system-on-chip (SOC) coupled to a memory device, the SOC including at least one processor and a wireless display subsystem, the wireless display subsystem comprising:
a hardware composition generator to read video data from the memory device and generate video frame data by synthesizing the video data;
a hardware video encoder implemented to receive the video frame data from the hardware composition generator and generate an encoded video stream by encoding the video frame data; and
a wireless hardware transport stream multiplexer to receive the encoded video stream in an on-the-fly (OTF) manner from the hardware video encoder in a first mode, to receive the encoded video stream in a memory-to-memory (M2M) manner from the memory device in a second mode, to read an encoded audio stream from the memory device, to multiplex the encoded video stream and the encoded audio stream to generate multiplexed video and audio streams, and to generate a wireless display packet by packetizing the multiplexed video and audio streams;

wherein the video frame data output from the hardware composition generator are to be directly transferred to the hardware video encoder without being stored in the memory device in the first mode and are to be indirectly transferred to the hardware video encoder through the memory device in the second mode, and the encoded video stream output from the hardware video encoder are to be directly transferred to the wireless hardware transport stream multiplexer without being stored in the memory device in the first mode and are to be indirectly transferred to the wireless hardware transport stream multiplexer through the memory device in the second mode.

14. The SOC as claimed in claim 13, further comprising:

a wireless communication subsystem to control a radio frequency (RF) integrated circuit to wirelessly transfer the wireless display packet to a wireless display device.

15. A wireless display subsystem, comprising:

first hardware to generate video frame data using video data from a memory device;

second hardware to receive the video frame data from the first hardware and encode the video frame data to form an encoded video stream; and third hardware to receive the encoded video stream in a on-the-fly manner from the second hardware in a first mode, to receive the encoded video stream in a memory-to-memory (M2M) manner from the memory device in a second mode, to read an encoded audio stream from the memory device, to multiplex the video stream and the audio stream to generate multiplexed video and audio streams, and to packetize the multiplexed video and audio streams to generate a wireless display packet;

wherein the second hardware is to directly receive the video frame data from the first hardware without being stored in the memory device in the first mode and is to indirectly receive the video frame data from the first hardware through the memory device in the second mode, and the third hardware is to directly receive the encoded video stream from the second hardware without being stored in the memory device in the first mode and is to indirectly receive the encoded video stream from the second hardware through the memory device in the second mode.

16. The wireless display subsystem as claimed in claim 15, wherein transferring the video frame data and the encoded video stream in the on-the-fly manner is to be performed without storing the video frame data and the encoded video stream in the memory device in the first mode.

17. The wireless display subsystem as claimed in claim 15, further comprising: a hardware encryptor to encrypt the encoded video stream and the encoded audio stream to generate encrypted video and audio streams.

18. The wireless display subsystem as claimed in claim 17, further comprising: a hardware packetizer to packetize the encrypted video and audio streams.

\* \* \* \* \*